Dec. 29, 1936.  F. B. GEARHART ET AL  2,065,687
ZINC OXIDE
Filed June 8, 1932  2 Sheets-Sheet 2
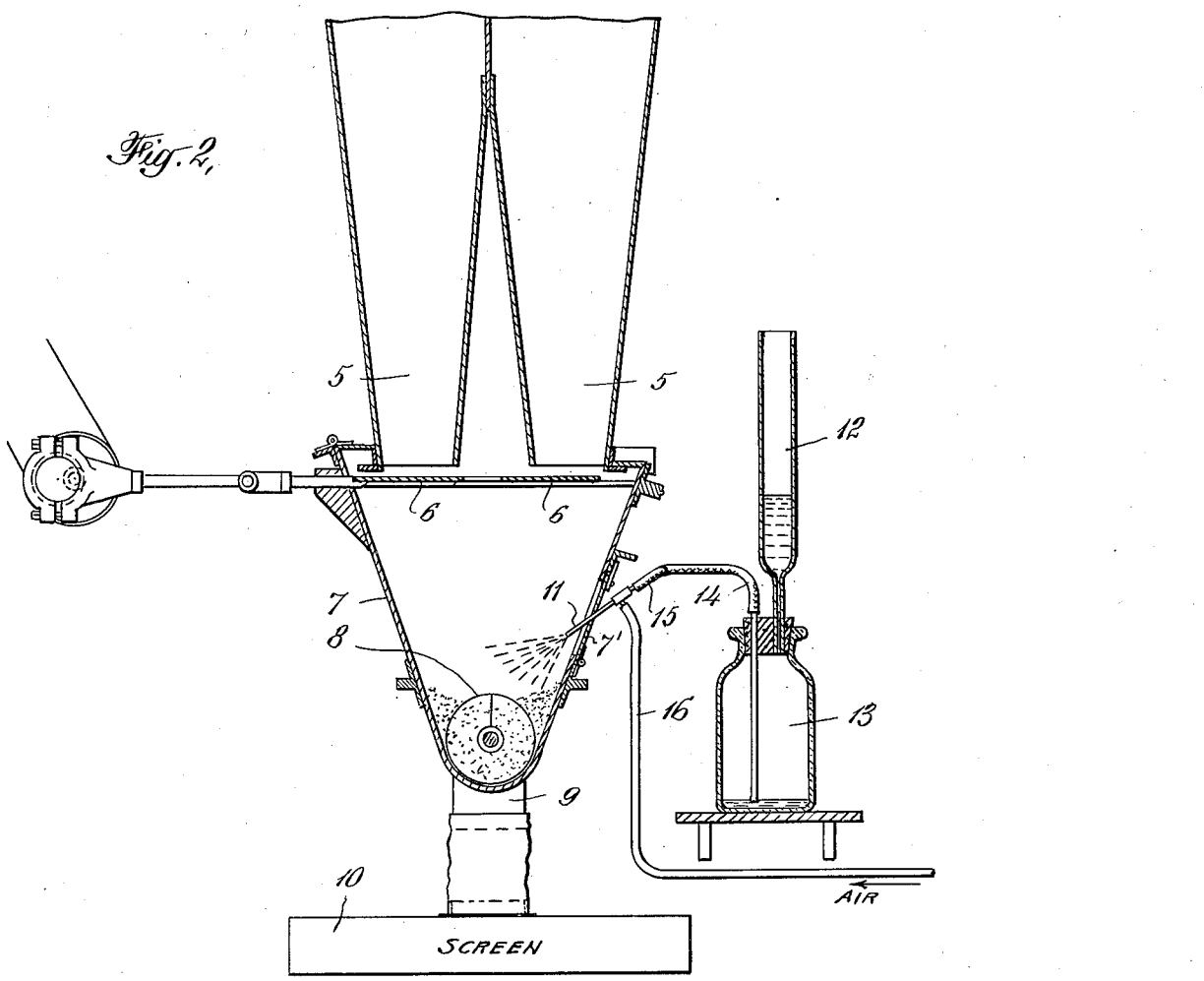
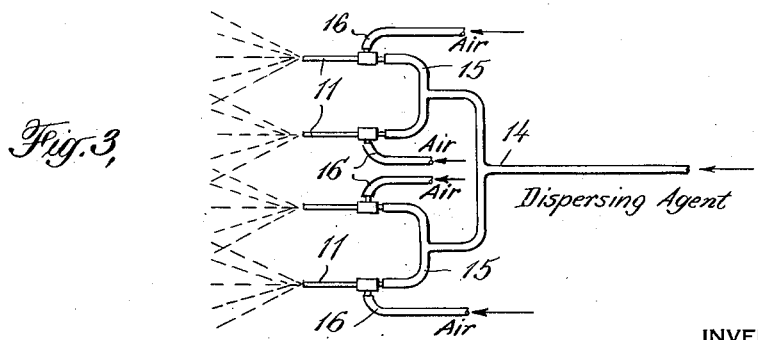
INVENTORS
Franklin B. Gearhart
Frederick A. Steele
BY
Pennie Davis Marvin + Edmonds
ATTORNEYS Patented Dec. 29, 1936

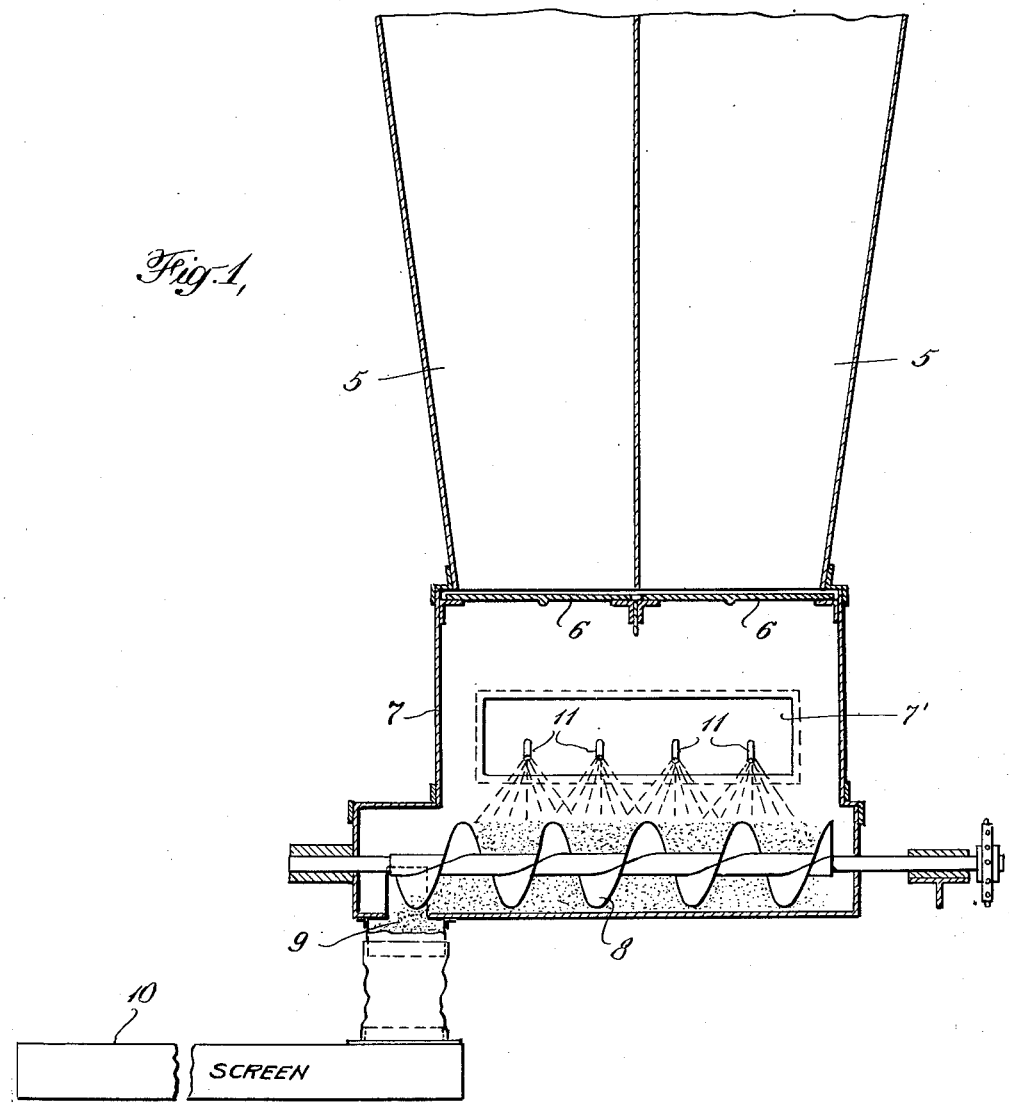

2,065,687

UNITED STATES PATENT OFFICE 2,065,687

ZINC OXIDE

Franklin B. Gearhart and Frederick A. Steele, Palmerton, Pa., assignors to The New Jersey Zinc Company, a corporation of New Jersey Application June 8, 1932, Serial No. 616,022

6 Claims. (Cl. 134—78)

This invention relates to zinc oxide and has for its object the provision of a method of treating zinc oxide to improve its dispersion in rubber and the like. More particularly, the invention aims to provide an improved method of treating zinc oxide with fatty acids or other rubber-softening or dispersing agents for the purpose of increasing its ease of dispersion in rubber and so facilitating its thorough incorporation therein.

Zinc oxide is extensively used in rubber compounds. The incorporation of the zinc oxide in the rubber is effected in various types of rubber mills and mixers, the aim being to disperse the zinc oxide particles uniformly throughout the rubber. When zinc oxide is incorporated in rubber in a modern high-speed mixing machine such, for example, as the Banbury mixer, difficulty is encountered due to the resistance shown by the zinc oxide to wetting by the rubber. This difficulty is greatest when a mixture of rubber and a relatively large proportion of zinc oxide, particularly oxide of fine particle size, is being prepared as a master batch intended for subsequent mixing in the final compound. Even after prolonged mixing, it is found that a portion of the zinc oxide is present in the mixture as small aggregates of undispersed oxide particles, the aggregates having the appearance of small pellets and being plainly visible to the naked eye. These pellets appear to be formed by the packing action of the ram or rotor of the Banbury mixer. The effect of this non-dispersion of the zinc oxide in the rubber compound is manifested in the final product by a lowering of the tear resistance and reduction in abrasive strength.

It has heretofore been recognized that the mixing properties of zinc oxide in rubber may be improved by treating the zinc oxide with fatty acids or other rubber-softening or dispersing agents. Soya bean oil, cottonseed oil, pine tar oil, palm oil, pine oil, inert mineral oil, China-wood oil, machine oil and solutions of rubber in benzene can be used to good effect to improve the dispersion of zinc oxide in rubber. The aim of the present invention is to provide an improved method of treating zinc oxide with such a dispersing agent in consequence of which uniform distribution of the agent on the surface of the zinc oxide particles is obtained, preferably in the form of a film of molecular dimensions.

It has heretofore been proposed to introduce atomized fatty acids into the pipe line from a zinc oxide furnace, that is into the gas stream carrying the zinc oxide in suspension from the zinc oxide furnace to the bag-room. While a uniform dispersion of the fatty acid upon the surface of the zinc oxide particles can be secured by this method, only about 60% of the fatty acid used is actually deposited on the zinc oxide, the remaining 40% being lost in one way or another.

Various wet methods of coating zinc oxide with fatty acids have been suggested. For example, it has been proposed that the fatty acids be dissolved in a solvent, such as benzene, and the zinc oxide dispersed in the resulting solution, whereupon, on evaporating the solvent, the zinc oxide is coated by the fatty acid. It has also been suggested that fatty acids or similar agents be emulsified in water and the zinc oxide brought into suspension in the emulsion. On breaking the emulsion by adding an electrolyte the fatty acid in adsorbed by the zinc oxide. It has also been suggested that fatty acids be applied to zinc oxide by chemical precipitation, for example, by bringing the zinc oxide into suspension in a soap solution and then liberating the fatty acid from the soap by the action of a mineral acid, whereupon the fatty acid is precipitated upon the zinc oxide. These wet methods of applying a fatty acid to zinc oxide suffer from the disadvantage of being expensive and difficult to control. Furthermore, in such methods the zinc oxide tends to flocculate, that is to say, the primary particles tend to adhere together in flakes that are difficult to redisperse subsequently.

The method of the present invention is characterized by utilizing the step of bolting zinc oxide for the purpose of mechanically mixing the dispersing agent therewith. It is usually the practice to screen the zinc oxide through a bolter such for example as an ordinary flour bolter, just before packing it. The object of this screening treatment is to remove particles of grit as well as fragments of extraneous matter. We have found that by spraying the dispersing agent on to the zinc oxide and then mechanically mixing the oxide and agent, as for example in a screw conveyor, the resulting mixture can be passed through a fine-mesh screen, such as bolting cloth, without clogging the screen or other operating difficulty.

The accompanying drawings illustrate, somewhat diagrammatically, an appropriate form of apparatus for the practice of the invention. In the drawings, Fig. 1 is a side elevation of the apparatus, Fig. 2 is an end elevation, and Fig. 3 is a detailed view of the spraying arrangement.

The apparatus shown in the drawings comprises a four compartment zinc oxide hopper 5 provided with sliding gates 6 at the bottom thereof. The hopper compartments discharge into a V-shaped trough 7 having a screw conveyor 8 operatively mounted in the apex at the bottom thereof. The trough 7 has a discharge opening 9 at one end thereof, and a fine mesh screen 10, such as a bolter screen, is operatively mounted below the opening 9.

Atomizing nozzles 11 project through a door 7' on one side of the trough 7. The nozzles 11 project a slight distance into the trough and are positioned to direct the atomized spray therefrom downwardly towards the screw conveyor 8. The dispersing agent is charged into a reservoir 12, preferably in the form of a burette. From the burette, the agent flows at a controlled rate into a well 13 below the burette, and is drawn from the well 13 by a tube 14 extending to the bottom of the well and attached to auxiliary lines 15 leading to the atomizers 11. Compressed air is supplied to each of the atomizers 11 through an air line 16. The compressed air draws the dispersing agent from the well 13 and sprays it through the atomizers 11 into the shower of zinc oxide falling from the hopper compartments 5.

The zinc oxide to be treated is first fed into the compartments 5 of the hopper. From this hopper the oxide is released by the sliding gates 6 and falls upon the screw conveyor 8 by which it is conveyed to the bolter screen. The rubber softening or dispersing agent is sprayed upon the zinc oxide in atomized form as the oxide falls from the hopper compartments. The combined action of the atomized spray, the screw conveyor and the bolter screen results in uniform distribution of the dispersing agent on the surfaces of the zinc oxide particles.

It is now our preferred practice to use as the dispersing agent a mixture of cocoanut oil fatty acids, the chemical composition of which is about as follows:

| Acid | Per cent |
|---|---|
| Caproic | 2 |
| Caprylic | 9 |
| Capric | 10 |
| Lauric | 45 |
| Myristic | 20 |
| Palmitic | 7 |
| Stearic | 5 |
| Oleic | 2 |

It is preferable to atomize the fatty acids at a temperature in the neighborhood of 80° C., at which temperature most of the constituents thereof have an appreciable vapor tension.

Thus caproic acid boils at about 202° C. at 770 mm. Hg pressure; caprylic acid boils at about 124° C. under 10 mm. Hg pressure; capric acid boils at about 153° C. under 13 mm. Hg pressure; lauric acid boils at 102° C. in a vacuum, and at 176° C. under 15 mm. Hg pressure; myristic acid boils at about 121° C. in a vacuum and at about 196° C. under 15 mm. Hg pressure; palmitic acid boils at about 215° C. under 15 mm. Hg pressure, and at about 138° C. in a vacuum; stearic acid boils at 232° C. under 15 mm. Hg pressure and at about 155° C. in a vacuum; and oleic acid boils at 223° C. at 10 mm. Hg pressure, and at 153° C. in a vacuum.

In general, if the dispersing agent is heated until a marked odor is given off, it will have an appreciable vapor tension in the sense that the term is used here.

Other fatty acids, such as stearic acid and oleic acid, can be applied by the present method which is likewise suitable for the application of soya bean oil, cottonseed oil, pine tar oil, palm oil, pine oil, inert mineral oil Chinawood oil, machine oil, solutions of rubber in benzene or benzine, and the like. As indicated by the foregoing examples, the fatty acids employed in the practice of the invention are greasy in character.

After the zinc oxide thus mixed with the rubber softening or dispersing agent is passed through the bolter it is aged either by treatment at about 85° C. in an atmosphere with a relative humidity of 40% for 24 hours or by keeping in storage at ordinary temperature for several months. After either one of these aging treatments the rubber softening or dispersing agent will be found uniformly distributed on the zinc oxide surface so that substantially all the zinc oxide particles are coated therewith.

It is desirable to produce a coating of this nature in such a manner that its thickness is of molecular dimensions. The amount of fatty acid or other rubber softening or dispersing agent requisite to do this is of course a function of the surface area of the zinc oxide, which in turn is dependent on the particle size of the zinc oxide. It has been found that optimum results are obtained by treating zinc oxide of ordinary particle size (for example 0.3–0.4 micron) with from 0.25 to 0.4% of fatty acid, while zinc oxide of comparatively fine particle size (for example 0.21–0.23 micron) requires from 0.35 to 0.5% fatty acid. However amounts as low as 0.1% of the fatty acids are satisfactory in some cases and it is in general unnecessary and undesirable to add amounts exceeding 1%. The amounts to be used of the other rubber softeners or dispersing agents enumerated are of the same order of magnitude.

We claim:—

1. A method of treating zinc oxide which comprises spraying the zinc oxide with from 0.1 to 1.0% by weight of a greasy fatty acid, then screening the resulting sprayed zinc oxide to coat the zinc oxide particles with the fatty acid while simultaneously removing grit and extraneous matter from the zinc oxide, and aging the coated zinc oxide particles at a temperature in the neighborhood of 85° C. in an atmosphere with a relative humidity in the neighborhood of 40%.

2. In the bolting of pigment zinc oxide to remove extraneous matter by passing the pigment zinc oxide through a screen of approximately 300 mesh the improvement which comprises spraying the pigment zinc oxide with a greasy fatty acid prior to screening so that the screening operation effects the coating of the zinc oxide particles with the fatty acid simultaneously with the removal of grit and extraneous matter, and aging the coated zinc oxide particles after the screening operation at a temperature in the neighborhood of 85° C. in an atmosphere with a relative humidity of approximately 40% to effect an improvement in the uniformity of distribution of the fatty acid coating on the zinc oxide particles.

3. In the bolting of pigment zinc oxide to remove grit and extraneous matter by passing the pigment zinc oxide through a fine mesh screen, the improvement which comprises spraying the pigment zinc oxide with a liquid dispersing agent capable of dispersing zinc oxide in rubber, at such a temperature that said dispersing agent has an appreciable vapor tension, the weight of the dispersing agent being from $\frac{1}{10}$% to 1% of the weight of the pigment zinc oxide, so that the particle surfaces of the zinc oxide become partially coated with the dispersing agent, and then passing the partially coated particles through the fine mesh screen so that the dispersing agent becomes spread with substantial completeness over the particle surfaces of the zinc oxide and grit and extraneous matter are simultaneously removed from the zinc oxide.

4. In the bolting of pigment zinc oxide to remove grit and extraneous matter by passing the pigment zinc oxide through a fine mesh screen, the improvement which comprises spraying the pigment zinc oxide with a liquid dispersing agent selected from the group consisting of greasy fatty acids, soya bean oil, cottonseed oil, pine tar oil, palm oil, pine oil, inert mineral oil, China-wood oil and machine oil at such a temperature that said dispersing agent has an appreciable vapor tension, the weight of the dispersing agent being from $\frac{1}{10}$% to 1% of the weight of the pigment zinc oxide, so that the particle surfaces of the zinc oxide become partially coated with the dispersing agent, and then passing the partially coated particles through the fine mesh screen so that the dispersing agent becomes spread with substantial completeness over the particle surfaces of the zinc oxide and grit and extraneous matter are simultaneously removed from the zinc oxide.

5. In the bolting of pigment zinc oxide to remove grit and extraneous matter by passing the pigment zinc oxide through a fine mesh screen, the improvement which comprises spraying the pigment zinc oxide with a liquid dispersing agent capable of dispersing zinc oxide in rubber, the weight of the dispersing agent being from $\frac{1}{10}$% to 1% of the weight of the pigment zinc oxide, so that the particle surfaces of the zinc oxide become partially coated with the dispersing agent, passing the partially coated particles through the fine mesh screen so that the dispersing agent becomes spread with substantial completeness over the particle surfaces of the zinc oxide and grit and extraneous matter are simultaneously removed from the zinc oxide, and then aging the screened zinc oxide for at least 24 hours.

6. In the bolting of pigment zinc oxide to remove grit and extraneous matter by passing the pigment zinc oxide through a fine mesh screen, the improvement which comprises spraying the pigment zinc oxide with a mixture of cocoanut oil fatty acids, the weight of the mixture being from .1 to 1% of the weight of the pigment zinc oxide and the temperature of the mixture being in the neighborhood of 80° C. whereby the particle surface of the zinc oxide becomes partially coated with the mixture, and then passing the partially coated particles through the fine mesh screen so that the mixture becomes spread with substantial completeness over the particle surfaces of the zinc oxide, and grit and extraneous matter are simultaneously removed from the zinc oxide.

FRANKLIN B. GEARHART.
FREDERICK A. STEELE.